United States Patent [19]

Hinrichs

[11] 3,831,559

[45] Aug. 27, 1974

[54] STOCK TREATMENT DEVICE

[76] Inventor: Bert F. Hinrichs, 926 N. Hampton Blvd., Shelbyville, Ind. 46176

[22] Filed: Aug. 24, 1972

[21] Appl. No.: 283,493

[52] U.S. Cl. ............................................. 119/157
[51] Int. Cl. ........................................... A01k 29/00
[58] Field of Search............... 119/157, 156, 159

[56] References Cited
UNITED STATES PATENTS

| 1,057,588 | 4/1913 | Smith | 119/157 |
| 2,706,465 | 4/1955 | Caldwell | 119/157 |
| 2,845,897 | 8/1958 | Pelc | 119/157 |
| 2,892,448 | 6/1959 | Merwin | 119/157 |
| 3,062,187 | 11/1962 | Piel | 119/157 |
| 3,137,274 | 6/1964 | Palmer | 119/157 |
| 3,159,144 | 12/1964 | Duncan et al. | 119/157 |
| 3,196,836 | 7/1965 | Piel | 119/157 |
| 3,202,132 | 8/1965 | Lentz et al. | 119/157 |
| 3,283,748 | 11/1966 | Petersen | 119/157 |
| 3,538,891 | 11/1970 | Williams | 119/157 |

FOREIGN PATENTS OR APPLICATIONS

| 691,707 | 8/1964 | Canada | 119/157 |

Primary Examiner—Hugh R. Chamblee
Attorney, Agent, or Firm—Hood & Coffey

[57] ABSTRACT

A stock treatment device which provides a comb-strung flexible strand suspended so that a domestic animal may conveniently rub its hide against the strand. The strand is so suspended that when an animal does so rub itself, a pump will be actuated to deliver treatment liquid to an elevated region of the strand so that the liquid will saturate the strand and rub off onto the animal's hide. A face treater is associated with the strand and pump to attract animals to the assembly and includes an improved box for containing salt or other bait. The combs on the strand are of novel construction to assist in distributing the liquid which is delivered to the strand.

11 Claims, 10 Drawing Figures

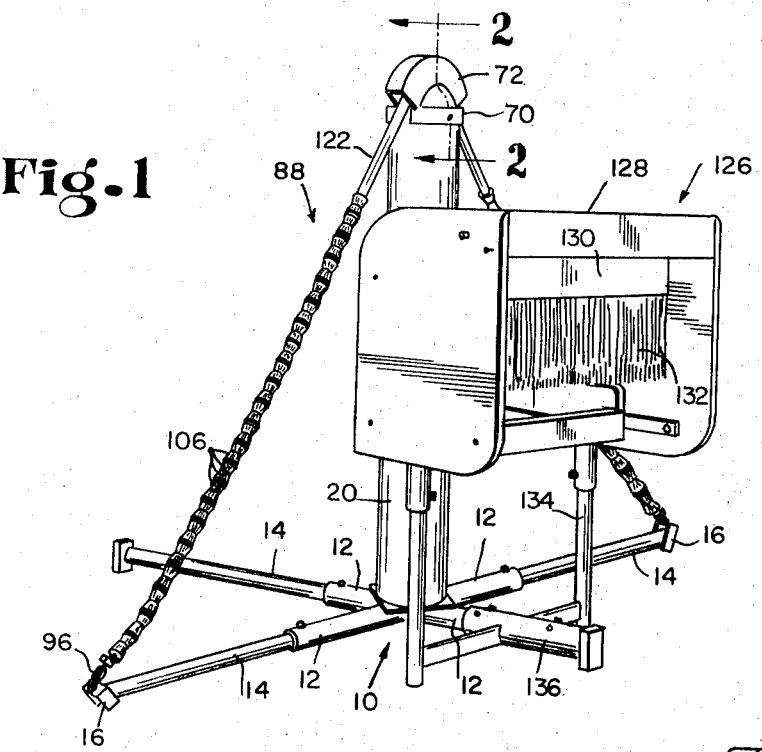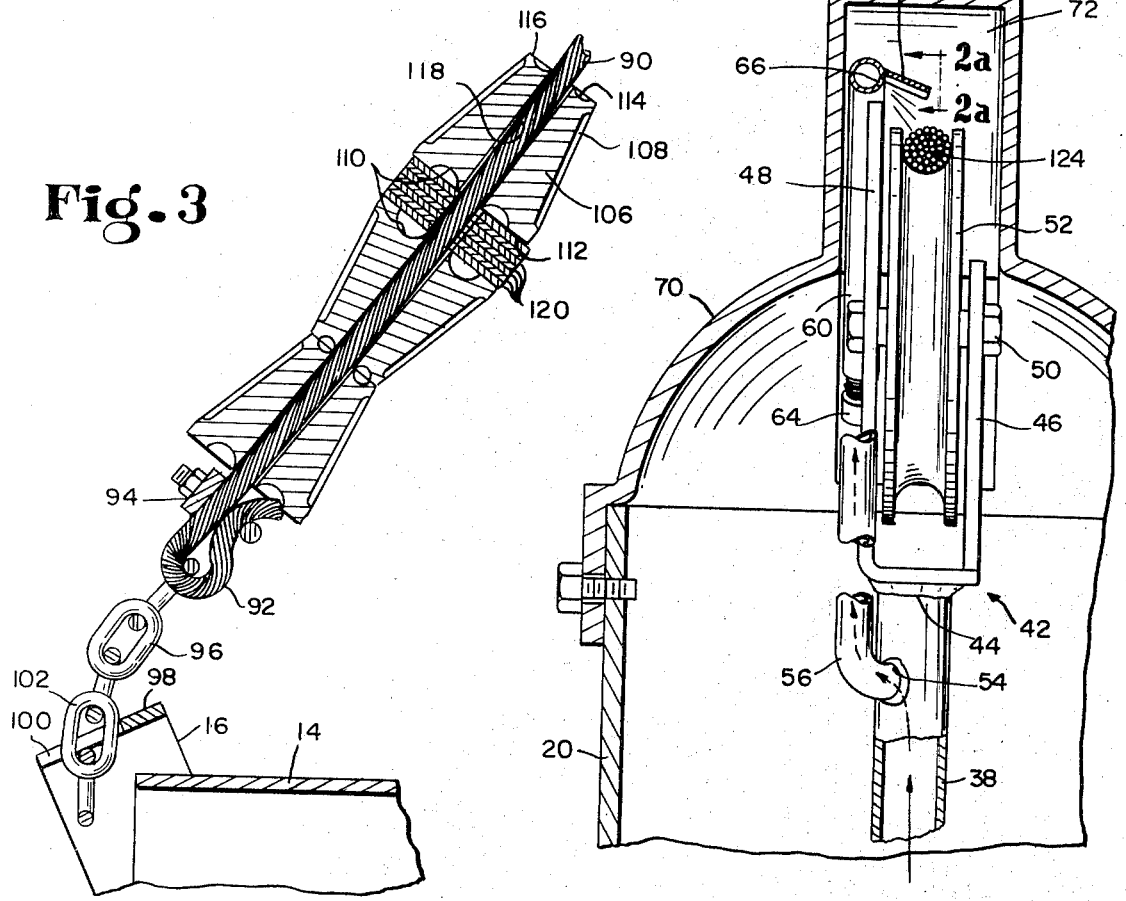

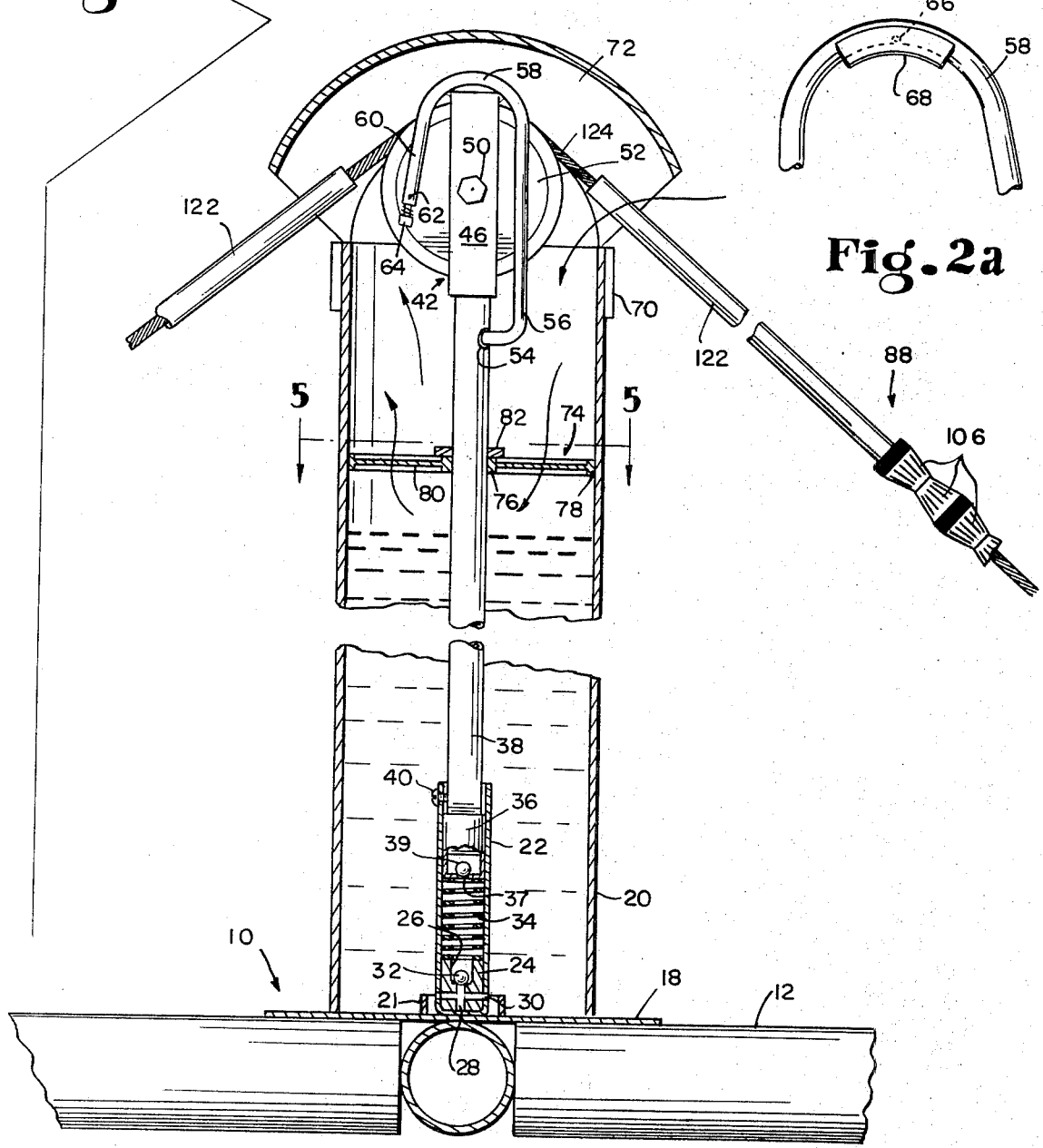
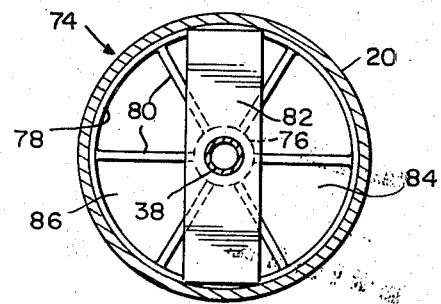

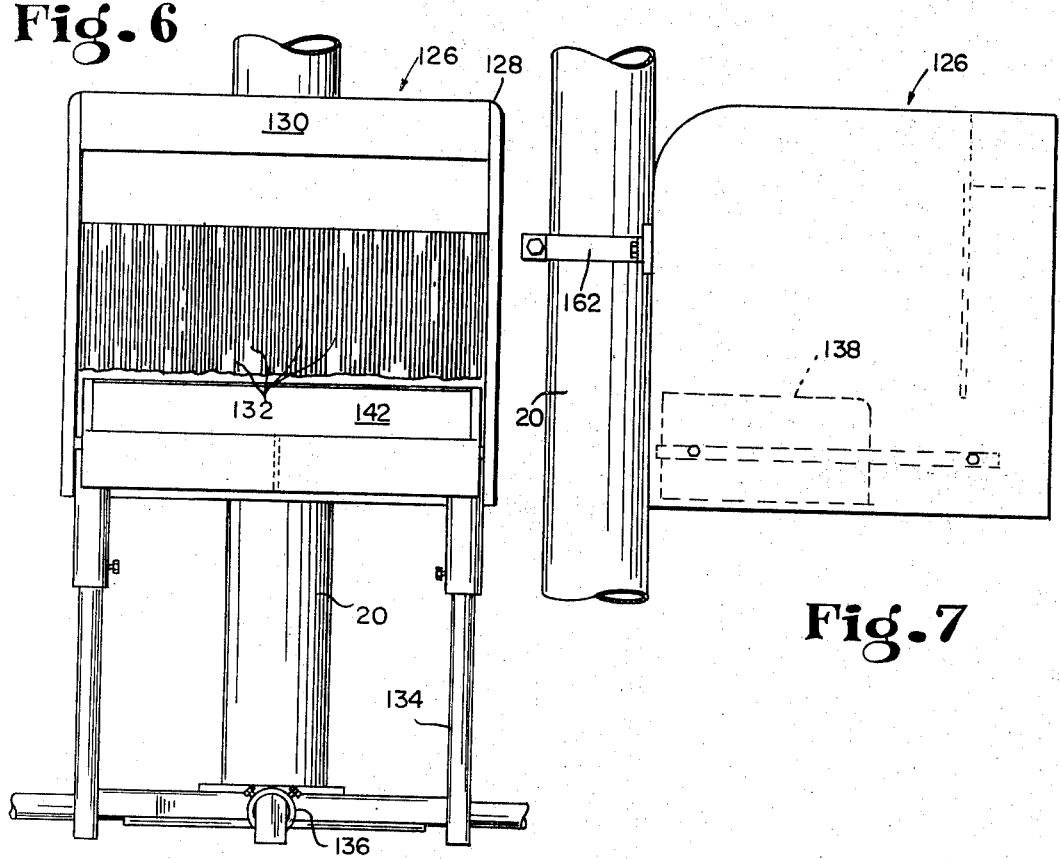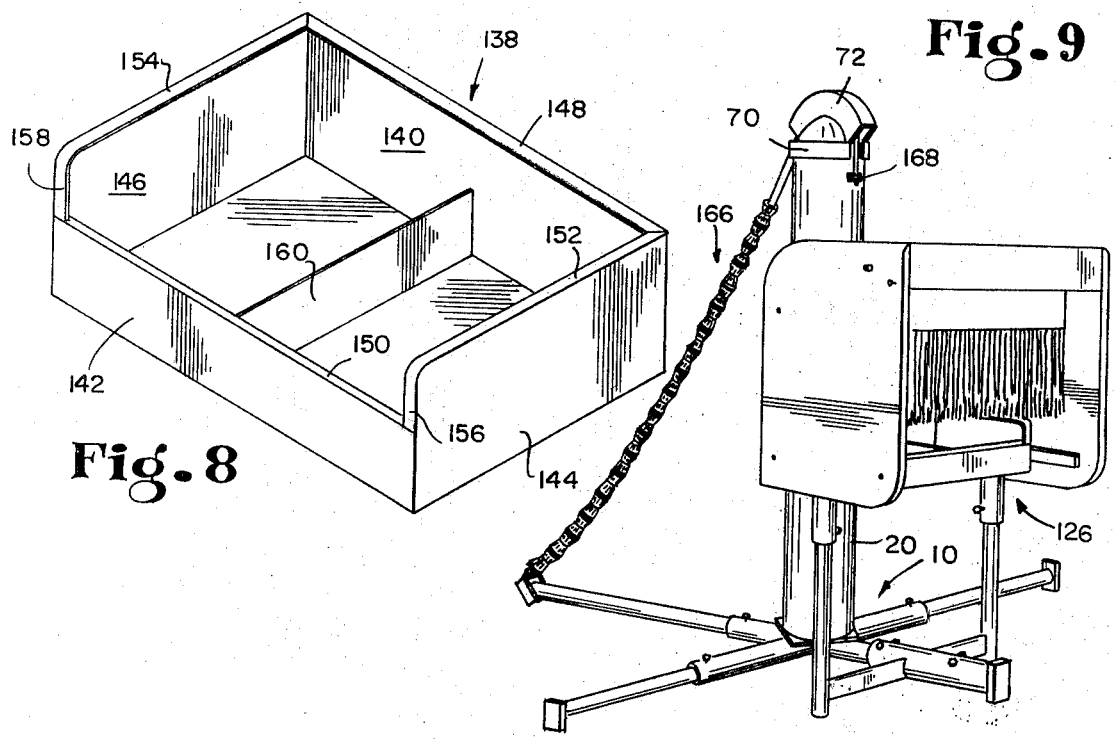

STOCK TREATMENT DEVICE

The present invention relates to apparatus for treating domestic animals to protect them against insect pests and its principal object is to provide such apparatus which includes an element against which an animal may rub its body, that element being so arranged and connected that, when an animal does so rub thereagainst, pumping mechanism will be actuated to deliver a quantity of therapeutic liquid to impregnate and flow along that element so that, upon rubbing against that element, the animal will spread such liquid upon its own body. A further object of the invention is to provide improved pumping means for the above purpose.

Another object of the invention is to attract animals to treating means of the above character by directly associating therewith a baiting device. Face treaters are known, comprising holders for salt and/or other minerals positioned behind a curtain of wicks impregnated with a therapeutic liquid and so arranged that an animal must push its face through the curtain to gain access to the minerals disposed therebehind. It is an object of this invention physically to associate such a face treater with the body oiler mechanism above described whereby cattle which are familiar with face treaters will be baited to the vicinity of the body oiler and will be encouraged to use the body oiler.

A further object of the invention is to provide a novel and improved rubbing element comprising a flexible strand having threaded thereon a series of frustoconical combs so constructed and arranged as to receive oil from the flexible strand on which they are arranged and to retain such oil, distribute it over the external surfaces of the combs and thereby facilitate the transfer of the therapeutic liquid to the bodies of the animals which rub against the strand means.

Another object of the invention is to provide, in connection with such pumping means, conduit means constructed and arranged to deliver liquid to the uppermost region of such a rubbing element, together with regulatory means for controlling the quantity of liquid so delivered when an animal rubs against strand means and deflector means for closely confining the stream of liquid so delivered.

Still further objects of the invention will appear as the description proceeds.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a perspective view of one form of apparatus constructed in accordance with the present invention;

FIG. 2 is a fragmentary section, drawn to an enlarged scale, and taken substantially on the line 2—2 of FIG. 1;

FIG. 2a is a fragmentary elevation taken substantially on the line 2a—2a of FIG. 2;

FIG. 3 is an enlarged sectional fragmentary view showing details of the strand means including the combs and a means for anchoring one end of the strand means;

FIG. 4 is a vertical section taken at right angles to the plane of FIG. 2;

FIG. 5 is a horizontal section taken substantially on the line 5—5 of FIG. 4;

FIG. 6 is a fragmentary elevation looking into the face feeder of FIG. 1;

FIG. 7 is a fragmentary side elevation taken from the left of FIG. 6;

FIG. 8 is a perspective view of the improved bait box used in the face feeder; and FIG. 9 is a perspective view similar to FIG. 1 but showing a modified form of the invention.

Referring more particularly to the drawings, it will be seen that I have illustrated a base indicated generally by the reference numeral 10 and comprising a plurality of spider legs 12, 12 with three of which are associated extension legs 14, 14. Anchor members 16 are fixed to two of the extension members 14, as shown, for a purpose which will appear.

At the center of the base 10 is a fixed baseplate 18 carrying an upstanding, open-topped reservoir 20. Fixedly secured in the bottom of the reservoir 20 is a ring 21 loosely confining the bottom end of a cylinder 22 in which is fixed a block 24 formed with an upwardly opening cavity 26. A vertical bore 28 opens into said cavity and is intersected by a transverse bore 30 through the cylinder walls and the block 24. A check valve 32 which may take the form of a simple, solid ball, is gravity biased to close the mouth of the bore 28 against downward liquid flow, but will permit upward liquid flow through said bore mouth.

A heavy, compression spring 34 rests upon the upper end of the block 24 and supports a hollow, brass piston head 36. The bottom of said piston head is formed with a port 37 with which cooperates a check valve 39 to prevent downward liquid flow through said port but to permit upward liquid flow therethrough.

A hollow piston rod 38, which may be a simple ferrous-metal pipe, threadedly carries, and communicates with the interior of, the piston head 36. The piston head 36 is snugly slidable in the cylinder 22 and is blocked against removal therefrom by, for instance, a retainer screw 40.

The upper end of the rod 38 is closed as, for instance, by a fitting 42 which may be welded thereto as at 44, and said fitting comprises a pair of upstanding plates 46, 48 bridged by an axle 50 upon which is journal mounted a sheave 52.

A lateral port 54 giving access to the interior of the piston rod 38 receives a conduit 56 which, as is perhaps most clearly illustrated in FIG. 4, extends upwardly alongside the plate 48 to a level above the uppermost point on the periphery of the sheave 52 where it is bent as at 58 to define a bight. From the bight 58, the conduit 56 has a downward extension 60 which is formed, near its lower extremity, with an exhaust port 62 controlled by a regulable valve 64 which may, for instance, be a needle valve.

Within the bight region 58, the conduit 56 is formed with a delivery port 66 directed generally toward the uppermost region of the sheave 52; and a shield or deflector 68, which conforms generally to the bend 58, is secured to said conduit to overlie the port 66 and ensure that liquid delivered through the port 66 will be directed properly.

A cap 70 is secured to the upper end of the reservoir 20 and overlies that open end of the reservoir. The cap 70 is formed to provide an arcuate, open-ended tunnel 72 which enshrouds the upper portion of the sheave 52, the bight 58 with its port 66 and the shield 68, and opens radially inwardly in registry with the open upper end of the reservoir 20. It will thus be seen that excess pumped liquid will fall back into the reservoir 20.

Furthermore, wind entering the tunnel 72 will be directed downwardly thereby and into the reservoir, as indicated by the arrows in FIG. 4. It is desirable that such wind should flow downwardly into the reservoir substantially to the surface of the liquid therein and should then flow upwardly and escape from the reservoir. To encourage such air movement, I prefer to mount a baffle plate 74 on the piston rod 38 at a level such that it will always remain above the liquid level in the reservoir. The baffle plate comprises a hub 76 which may be secured to the piston rod 38 in any suitable way, a perimetral wall 78 snugly fitting the walls of the reservoir and supported from said hub by spokes 80, and a diametrical wall 82 to define openings 84 and 86 on opposite sides of said diametrical wall. It will be seen that, because of the baffle plate 74, wind entering at one side of the open top of the reservoir will flow downwardly through the opening 84, thence across the surface of the liquid in the reservoir and thence upwardly through the opening 86 to escape through the open upper end of the reservoir and the opposite end of the tunnel 72. One function of such a flow of air is to absorb any moisture which might tend to accumulate on the surface of the liquid within the reservoir. If water should accumulate for any substantial period, it would sink through the oil and might, during freezing weather, clog the ports 28 and 37 or interfere with the free movement of the valve members 32 and 39.

Referring again to FIG. 1, it will be noted that flexible strand means indicated generally by the reference numeral 88 is anchored at its opposite ends upon the blocks 16, 16. In the illustrated embodiment of my invention, the strand means comprises a twisted wire cable 90 each end of which is formed into a bight 92 and held in that condition by clamping means 94. The cable is threaded through one link of a logging chain fragment 96. The web 98 of the U-shaped anchorage element 16 is formed with a slot 100 which receives another link 102 of the chain 96 to secure the chain against movement relative to said anchorage element 16. When lateral force is exerted against either side of the strand means 88, the lower portions of the elements 16 will tend to dig into the ground to prevent bodily movement of the apparatus under the exerted forces.

As is most clearly shown in FIGS. 1, 2 and 4, a median region 124 of the cable 90 is trained over the sheave 52 so that the flexible strand means depends and inclines outwardly to its laterally-spaced points of anchorage to the elements 16, 16. According to my invention, I prefer to string a series of combs 106 upon each laterally outwardly declining reach of the flexible strand means. As is most clearly shown in FIG. 3, each such comb comprises a right frustum of a cone externally formed with a peripheral series of axially-elongated ridges 108. The base 112 of each cone is formed with an annular groove 110 and the small end 116 of each cone may be formed with a similar annular groove 114. These grooves are made closely adjacent the axial bore 118 through each cone and, in fact, the inner peripheries of the grooves will preferably intersect the bore so that such inner peripheries are defined by relatively sharp edges.

The combs are threaded on the cable 90 in alternating reverse positions and a plurality of flat washers 120 will be interposed between each pair of combs which are presented in base-to-base relationship. I have found that seven such washers at each such position is an optimum arrangement.

The series of combs preferably extend from a point close to the ground to an elevation above the back of the average animal for which the apparatus is designed. Shrouds 122 will enclose the cable lengths above the upper ends of the comb series but will terminate below the region of engagement of the cable 90 with the sheave 52. Thus, as is most clearly illustrated in FIGS. 2 and 4, the median region 124 of the cable 90 which is directly associated with the bearing sheave 52 is left exposed.

It will be seen that, every time an animal rubs against one of the series of combs, a tensile force will be applied between the adjacent anchorage and the point of engagement of the cable 90 with the sheave 52. The horizontal component of that force will be relieved by rotation of the sheave, but the vertical component of that force will move the piston rod 38 and piston 36 downwardly against the tendency of the spring 34. The chamber between the valve 32 and the piston head 36 will thereby be reduced in volume and liquid in that chamber will be forced to flow upwardly, dislodging the valve 39, to be discharged through the conduit 56. If the valve 64 is closed, a corresponding volume of liquid will be delivered through the port 66 to the exposed portion 124 of the cable 90. If, however, the valve 64 is open to a predetermined degree, then only a predetermined portion of the slug of liquid so pumped will be delivered through the port 66, the remaining proportion being discharged through the exhaust port 62 and back to the reservoir.

Because of its twisted wire construction, the cable 90 will absorb and become impregnated with liquid so delivered to it, and as liquid flows downwardly in both directions from the point of delivery, the cable will become saturated. Furthermore, as the oil flows downwardly along the cable, some of it will be caught by the sharp edges and held in the grooves 110 and 114. Through a capillary type of action, part of the liquid retained in grooves 110 will flow radially outwardly along the surfaces of the washers 120 and the minute spaces between those washers will likewise create a capillary action which will carry oil outwardly between each adjacent pair of washers. Thus, the external surfaces of the combs will be moistened with the liquid which is delivered through the port 66 and, as an animal rubs against the series of combs, liquid will be spread on the animal's coat.

Each time the animal exerts a force against the flexible strand means, the piston 36 will be activated. Obviously, when pressure against the strand means is relieved, the spring 34 will return the piston rod 38 to its uppermost position; and as the effective volume of the chamber between the block 24 and the piston 36 enlarges, the valve 39 will close and the valve 32 will open to permit liquid in the reservoir to be forced by air pressure past the valve 32 into said chamber.

While domestic animals as a rule are curious and will investigate any new item in a pasture, I believe that it is desirable to bait them to my oiler apparatus and therefore I have shown a face treater indicated generally by the reference numeral 126 associated with the above-described apparatus. A cabinet 128 contains, near its open front face, a reservoir 130 for feeding a therapeutic liquid to a curtain of depending wicks 132. The cabinet 128 is supported upon telescopic legs 134, 134 which, in turn, are carried by a fitting 136 adapted to sleeve upon one of the spider arms 12 of the base 10.

Suitably supported within the cabinet 128 and behind the curtain 132 is an improved box indicated generally by the reference numeral 138. The box comprises a tall rear wall 140, a significantly lower front wall 142 and side walls 144 and 146 joining the front and rear walls. The rear wall is formed to provide an inturned flange 148 at its upper end, the distal edge of the flange being rolled back upon itself to provide a smooth surface, the front wall is provided with a similar flange 150, the side walls are formed to provide similar flanges 152 and 154 and to provide, as well, flanges 156 and 158 at the front edges of said side walls. The flanges are all inturned to overlie the internal surfaces of their respective walls, thus to guard against spillage of the bait material received within the box. The box may contain salt or, if desired, it may be divided into two laterally separated chambers by means of a partition 160 so that salt may be maintained in one compartment while other minerals may be placed in the other compartment.

The entire box is porcelain coated to facilitate cleaning and to guard against corrosion.

Desirably, a clamping band or strip 162 may be secured to the rear wall of the cabinet 128 and may be wrapped about, and clamped in place on, the reservoir 20 to stabilize the whole assembly.

Animals will be attracted by the available minerals and stop to investigate the oiler apparatus.

In FIG. 9, I have illustrated a modified form of apparatus. According to this form, the base 10 supports the same reservoir and pumping apparatus and the same face treater but utilizes only one strand section 166 against which the animal may rub. The strand means is anchored at its lower end upon an element of the base and that portion of its length which is disposed within the range occupied by the body of an average animal of the type to be protected is strung with combs of the character above described. As in the embodiment previously described, an intermediate portion of the twisted wire cable is trained over a sheave like the sheave 52 within the tunnel portion 72 of a cap 70 and is exposed to liquid delivered from a port like the port 66. The cable terminates, however, just beyond its engagement with the sheave and its opposite end portion is anchored in any suitable fashion upon the reservoir 20, as shown at 168 in FIG. 9.

The mode of operation of the apparatus illustrated in FIG. 9 is directly comparable to that described in connection with the embodiment shown in FIG. 1. Each time an animal rubs against the strand means 166, the pumping plunger will be actuated to deliver liquid to the strand means, the lateral component of the force exerted against the strand by the animal being largely absorbed by turning movement of the sheave 52 and the vertical component being exerted downwardly against the pump plunger and upwardly against the reservoir 20.

What is claimed is:

1. A cattle treating device comprising base means, means providing an upstanding reservoir for receiving treatment fluid, said reservoir being mounted on said base means and having an upper portion and a lower portion, strand means extending downwardly and outwardly from said upper portion to be engaged by cattle, means for pumping such treatment fluid from said reservoir, said pumping means including an actuating plunger having an engaging portion adjacent said upper portion and means providing a delivery port adjacent said engaging portion, said pumping means being disposed such that, when said plunger is reciprocated, such fluid is exhausted through said delivery port, said strand means being operatively connected to said engaging portion such that said plunger is reciprocated when cattle rub against said strand means, shield means mounted on said device for directing such fluid leaving said delivery port onto said strand means, said engaging portion of said plunger including a journal mounted pulley over a portion of which said strand means is trained, said means providing said delivery port including a conduit adjacent the peripheral portion of said pulley, said port being formed in said conduit and positioned to deliver such fluid toward said peripheral portion, said shield means being proportioned and designed to extend about said peripheral portion and the portion of said strand means thereon, the journal axis of said pulley being generally horizontal, said peripheral portion being the upper peripheral portion of said pulley, said conduit being arcuately formed adjacent and about said upper peripheral portion to direct such fluid downwardly thereon, and said shield means including a flange mounted on said conduit and formed to extend about said peripheral portion and downwardly toward said strand means thereon.

2. An animal treating apparatus comprising, in combination an open-topped reservoir, pumping means comprising an upstanding cylinder located near the bottom of said reservoir, a hollow piston reciprocable in said cylinder, an upstanding hollow piston rod secured to said piston, and spring means urging said piston upwardly, bearing means near the upper end of said rod, flexible strand means trained over said bearing means and having opposite end portions anchored at points differently laterally spaced from the axis of said rod and at levels lower than said bearing means, conduit means leading from the interior of said piston rod to deliver liquid from said reservoir onto said strand means near its point of operative engagement with said bearing means, said strand means being capable of capillary retention of substantial quantities of liquid so delivered while permitting flow of such liquid throughout the length of said strand means, a series of combs strung loosely on said strand means throughout that portion of its length which is disposed within the range of elevation from the ground which is occupied by the body of an average bovine, each such comb being a frustum of a right cone externally formed with axially-elongated, peripherally-separated ridges, said combs being arranged on said strand means in alternately inverted succession, the mutually-facing surfaces of certain adjacent combs being formed with registering, liquid-collecting channels.

3. The apparatus of claim 2 including a plurality of flat washers strung on said strand means between each adjacent pair of combs which are presented base-to-base.

4. An animal treating apparatus comprising, in combination, an open-topped reservoir, pumping means comprising an upstanding cylinder located near the bottom of said reservoir, a hollow piston reciprocable in said cylinder, an upstanding hollow piston rod secured to said piston, and spring means urging said piston upwardly, bearing means near the upper end of said rod, flexible strand means trained over said bearing means and having opposite end portions anchored at points differently laterally spaced from the axis of said rod and at levels lower than said bearing means, conduit means leading from the interior of said piston rod to deliver liquid from said reservoir onto said strand means near its point of operative engagement with said bearing means, and a cap for said reservoir proportioned and designed to define an upwardlyarcuate, open-ended tunnel enshrouding a portion of said bearing means and communicating radially inwardly with the open end of said reservoir.

5. The apparatus of claim 4 including a baffle plate mounted on said apparatus and to move with said piston rod above the level of liquid in said reservoir, said plate comprising a perimetral rim snugly reciprocably fitting the internal wall of said reservoir, and a diametrical wall substantially perpendicular to the longitudinal extent of said tunnel, said baffle being open at the lateral sides of said diametrical wall.

6. An animal treating apparatus comprising, in combination, an open-topped reservoir, pumping means comprising an upstanding cylinder located near the bottom of said reservoir, a hollow piston reciprocable in said cylinder, an upstanding hollow piston rod secured to said piston, and spring means urging said piston upwardly, bearing means near the upper end of said rod, flexible strand means trained over said bearing means and having opposite end portions anchored at points differently laterally spaced from the axis of said rod and at levels lower than said bearing means, conduit means leading from the interior of said piston rod to deliver liquid from said reservoir onto said strand means near its point of operative engagement with said bearing means, said conduit means extending upwardly alongside said bearing means to a level above the top of said bearing means and there being provided with a delivery port directed toward said strand means disposed at the top of said bearing means, and a shield disposed above said port and inclined downwardly and toward said bearing means to deflect liquid delivered from said port toward said bearing means and strand means.

7. The apparatus of claim 6 in which said conduit means extends beyond said delivery port and is there provided with a valve-controlled exhaust port.

8. The apparatus of claim 7 in which said bearing means, said delivery port and said exhaust port are all disposed in registry with the open top of said reservoir so that excess liquid discharged from said ports is returned to said reservoir.

9. In an animal treating device, flexible strand means, laterally-separated anchorages for the opposite ends of said strand means, means engaging said strand means in a region between its anchored ends to suspend said strand means above said anchorages, thereby defining laterally declining regions of said strand means, means for delivering liquid to an upper region of at least one of said declining regions, a series of combs strung on said one declining region, each comb being a right frustum of a cone, said combs being arranged in alternating reverse positions on said strand, and each comb being formed with an axial bore and being further formed in its base with a concentric groove closely adjacent said bore.

10. The device of claim 9 in which each comb is formed at its smaller end with a concentric groove closely adjacent said bore.

11. The device of claim 9 including a plurality of flat washers interposed between those combs which are presented base-to-base.

* * * * *